United States Patent
Nerheim

(10) Patent No.: US 7,218,077 B2
(45) Date of Patent: May 15, 2007

(54) SYSTEMS AND METHODS FOR SIGNAL GENERATION USING LIMITED POWER

(75) Inventor: Magne H. Nerheim, Scottsdale, AZ (US)

(73) Assignee: Taser International, Inc., Scottsdale, AZ (US)

( * ) Notice: Subject to any disclaimer, the term of this patent is extended or adjusted under 35 U.S.C. 154(b) by 320 days.

(21) Appl. No.: 10/949,828

(22) Filed: Sep. 24, 2004

(65) Prior Publication Data

US 2006/0071644 A1    Apr. 6, 2006

(51) Int. Cl.
*H01M 10/44* (2006.01)
*H01M 10/46* (2006.01)

(52) U.S. Cl. ..................................... 320/129

(58) Field of Classification Search .............. 320/114, 320/115, 129, 132; 327/3, 31, 175
See application file for complete search history.

(56) References Cited

U.S. PATENT DOCUMENTS

| | | | | |
|---|---|---|---|---|
| 3,736,516 A | * | 5/1973 | Ellis | ............................ 327/114 |
| 3,869,645 A | | 3/1975 | Collins | |
| 4,061,956 A | * | 12/1977 | Brown et al. | ................ 320/153 |
| 5,694,022 A | | 12/1997 | Ranta et al. | |
| 6,069,449 A | | 5/2000 | Murakami | |
| 6,617,808 B2 | | 9/2003 | Ito | |
| 7,012,797 B1 | * | 3/2006 | Delida | ........................ 361/230 |

* cited by examiner

*Primary Examiner*—Edward H. Tso
(74) *Attorney, Agent, or Firm*—William R. Bachand

(57) ABSTRACT

A signal generator provides an output signal having a series of pulses and a pulse repetition rate. The signal generator includes an energy storage circuit and a switch control circuit. The energy storage circuit includes a switch operated by the switch control circuit. After delivery of a pulse of the output signal, the switch control circuit operates the switch in a first mode to provide the pulse repetition rate of the output signal. The switch control circuit also operates the switch in each of the first mode and a second mode at a switching rate, wherein relatively more energy from a battery is stored as a consequence of the second mode than is stored as a consequence of the first mode. Energy from the battery is stored for delivery in a pulse of the output signal. The switching rate is compensated in accordance with a temperature of the battery and a voltage of the battery. Compensation maintains the battery voltage above a minimum value. Operation according to the value avoids current draw from the battery at a rate that may lead to an undervoltage condition of the battery. In one implementation, the power supply provides a high voltage for charging a capacitor for each cycle of an electric discharge weapon. Another value conveyed by the serial data provides a maximum pulse delivery rate for such a weapon.

26 Claims, 7 Drawing Sheets

SYSTEMS AND METHODS FOR SIGNAL GENERATION USING LIMITED POWER

FIELD OF THE INVENTION

Embodiments of the present invention relate to signal generators and particularly to signal generators operating from a limited power source.

BACKGROUND OF THE INVENTION

Conventional battery powered circuits are subject to failure when the voltage supplied by the battery drops below a tolerable limit. Battery voltage generally decreases as the battery discharges. A battery that is not fully discharged may also exhibit undesirable relatively low voltage. For example, when energy is drawn from the battery in pulses, the battery voltage may decrease during the delivery of a relatively high current pulse. Battery voltage may also decrease with decreasing temperature.

There remains a need for a signal generator circuit that provides relatively high energy pulses and operates reliably from battery power. Such a signal generator may be used in an electric discharge weapon where high reliability is desirable. Without systems and methods of the present invention, batteries cannot be used efficiently and reliably to full capacity by signal generator circuits.

SUMMARY OF THE INVENTION

A signal generator provides an output signal having a series of pulses and a pulse repetition rate. The signal generator includes an energy storage circuit and a switch control circuit. The energy storage circuit includes a switch operated by the switch control circuit. After delivery of a pulse of the output signal, the switch control circuit operates the switch in a first mode to provide the pulse repetition rate of the output signal. The switch control circuit also operates the switch in each of the first mode and a second mode at a switching rate, wherein relatively more energy from a battery is stored as a consequence of the second mode than is stored as a consequence of the first mode. Energy from the battery is stored for delivery in a pulse of the output signal. The switching rate is compensated in accordance with battery temperature and battery voltage. Compensation maintains the battery voltage above a threshold. Operation according to the threshold avoids current draw from the battery that may lead to an under-voltage condition of the battery.

An electric discharge weapon, according to various aspects of the present invention, includes a signal generator as discussed above.

In other implementations, the switch control circuit may receive a control signal that includes one or more of a modulation, indicia of battery temperature, and indicia of a desired pulse repetition rate for the output signal. Values may be conveyed in a serial data format of the control signal. As a safety feature, operation of the energy storage circuit may be discontinued by the switch control circuit when the modulation is not detected by the switch control circuit.

BRIEF DESCRIPTION OF THE DRAWING

Embodiments of the present invention will now be further described with reference to the drawing, wherein like designations denote like elements, and.

DETAILED DESCRIPTION OF THE PREFERRED EMBODIMENTS

A signal generator, according to various aspects of the present invention, includes a circuit that provides electrical energy in a manner that conveys either a predefined waveform or conveys information. A signal generator as discussed herein may receive electrical energy from a voltage and/or current limited source (e.g., a conventional battery). For example, a conventional battery supplies energy as a current at a relatively low voltage dependant on the chemical conditions of the battery. Steady current draw from a battery is typically associated with a steadily decreasing battery voltage as the battery discharges. For a signal generator designed to provide high energy pulse waveforms, each pulse having a relatively high peak voltage, reliable operation from a voltage and/or current limited source (e.g., a battery) may be accomplished by transferring energy from the source to an energy storage circuit and then delivering an output signal from the energy storage circuit. The voltage from the source may be stepped up and stored at a higher voltage. The current drawn from the source may be relatively low compared to the current delivered by the signal generator in a single pulse of the output signal.

Figure 1:
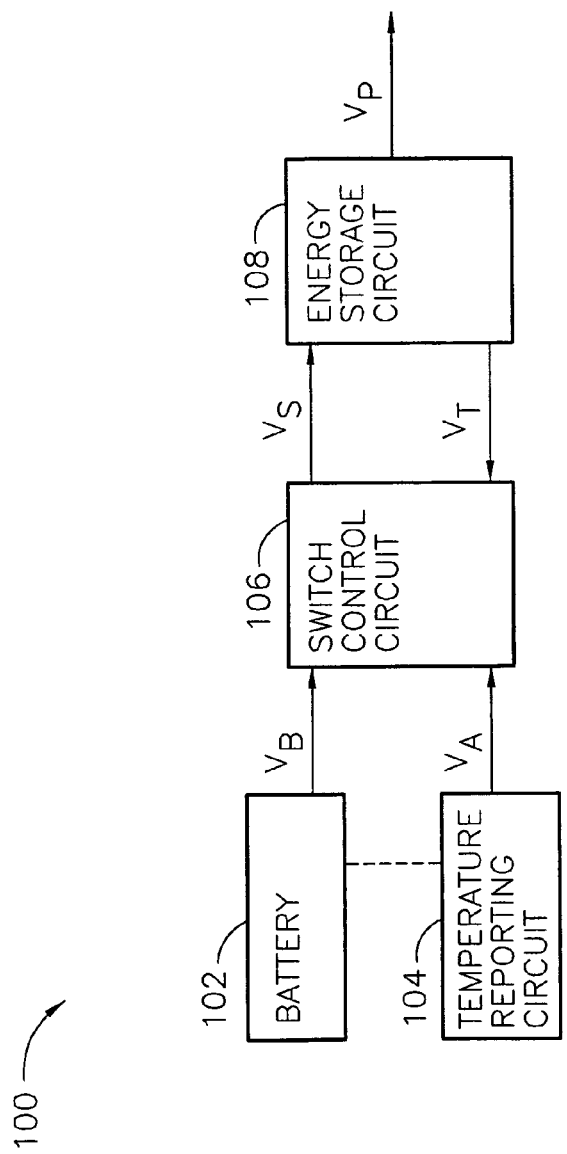
FIG. 1 is a functional block diagram of a signal generator according to various aspects of the present invention.

For example, signal generator 100 of FIG. 1 includes battery circuit 102, temperature reporting circuit 104, switch control circuit 106, and energy storage circuit 108. Conventional electronic circuit components and assembly techniques may be used to fabricate signal generator 100.

A battery circuit includes any source having limited voltage and current output capability compared to the voltage and current of the signal generator output signal. For example, battery circuit 102 delivers direct current electrical energy to all portions of signal generator 100 to facilitate operation of signal generator 100 in environments where no other power source is available. Battery circuit 102 may include any conventional circuit comprising energy storage components. Battery circuit 102 may further include conventional circuits for recharging chemical storage cells, such as thermal and/or optical (solar cells) components. A series combination of non-rechargeable lithium cells is preferred. As a battery of battery circuit 102 discharges and/or temperature of such a battery or other components of battery circuit 102 decreases, the battery circuit's capability to output sufficient energy may decrease, increasing a risk of a subsequent under-voltage condition of the battery circuit. An under-voltage condition is generally evident by a decrease in the voltage of signal $V_B$, for example, at a time when no current is being supplied, a predetermined current is being supplied, or a load is inadequately supplied.

A temperature reporting circuit provides a signal that indicates temperature of the battery circuit and/or ambient temperature of the environment in which the battery circuit operates. For example, temperature reporting circuit 104 may include a conventional thermocouple and/or semiconductor temperature sensing device coupled to a circuit that provides a suitable signal. The signal indicating temperature may include any conventional modulation (e.g., amplitude, frequency, pulse rate, phase or frequency shift keyed) and/or data format (e.g., binary, a set of codes, BCD) may be used to convey indicia of temperature. For example, temperature may be conveyed by control signal $V_A$ as a binary number and conveyed using a serial data signaling technique.

A switch control circuit operates at least one switch that couples energy from a source to an energy storage component. The switch may be a binary device (e.g., having "on" and "off" states). The switch may be an analog device having a linear range of conductivity. For example, switch control circuit 106 receives battery voltage $V_B$ from battery circuit 102 and receives control signal $V_A$ from temperature reporting circuit 104. By providing a switch control signal $V_S$, switch control circuit 106 operates a switch of an energy storage circuit. Switch control circuit 106, according to various aspects of the present invention, provides the switch control signal $V_S$ in a manner that avoids an under-voltage condition of battery circuit 102. Signal $V_S$ may include a modulation in accordance with temperature reporting circuit output signal $V_A$ and battery output signal $V_B$. Modulation may be any conventional modulation, for example a pulse repetition rate for operating a binary switch. For instance, as signal $V_B$ indicates a battery's present condition and control signal $V_A$ indicates a present temperature of a battery, switch control circuit 106 may adjust the modulation of signal $V_S$ to suitably avoid an under-voltage condition of the battery in general and/or during periods of relatively high current draw from the battery.

A switch control circuit may receive a feedback signal from the energy storage circuit. Because an energy storage circuit provides a load to the switch control circuit that may differ during operation of the signal generator in various environments, a feedback signal provides the switch control circuit an indication of the effectiveness of the switch control signal to meet demands of the energy storage circuit. The feedback signal may indicate that energy has been delivered, consequently indicating that operation of the switch is needed to recharge one or more energy storage components. For example, a switch control circuit may respond to a feedback signal provided by the energy storage circuit to begin, continue, or adjust a modulation of the switch control signal.

As discussed above, an energy storage circuit provides the signal generator's output signal. For example, output signal $V_P$ conveys energy generally supplied from at least one energy storage component of the energy storage circuit. Generally, an energy storage circuit receives energy in numerous relatively small increments and provides energy in fewer relatively large increments. For example, energy storage circuit 108 receives switch control signal $V_S$ to incrementally charge an energy storage component. Energy storage circuit 108 provides a series of relatively high energy pulses comprising the output signal $V_P$. Each output pulse comprising a relatively high energy. Delivery of each output pulse is indicated by feedback signal $V_T$, received by switch control circuit 106.

According to various aspects of the present invention, a signal generator of the type discussed above may operate as follows. As battery circuit 102 discharges and/or temperature reporting circuit 104 indicates a relatively elevated temperature of battery circuit 102, switch control circuit 106 may produce switch control $V_S$ in a manner that charges a component of energy storage circuit 108 sufficient to produce at least one pulse of output signal $V_P$ with decreased risk of an under-voltage condition arising from battery circuit 102. Switch control circuit 106 accordingly adjusts a modulation of switch control signal $V_S$. Modulation may also be adjusted in further response to a feedback signal $V_T$. Consequently, energy storage circuit 108 produces less energy per unit time in output signal $V_P$. Energy storage circuit 108 may maintain at least a predetermined energy per pulse of output signal $V_P$ while pulse repetition rate is decreased. In other words, a pulse repetition rate of the output signal $V_P$ may be reduced to avoid an under-voltage condition of battery circuit 102.

As discussed above, temperature reporting circuit 104, switch control circuit 106, and/or energy storage circuit 108 may use analog circuit and signaling techniques. In an preferred implementation facilitating field upgrades, temperature reporting circuit 104 and switch control circuit 106 are implemented using digital circuit and signaling techniques.

High voltage pulses are typically produced by an electric discharge weapon. For example, a weapon of the type described by Smith in U.S. Pat. No. 6,636,412 includes a signal generator that produces a series of high voltage pulses. A signal generator 200 of FIG. 2 may be used in an electric discharge weapon. Signal generator 200 includes an implementation of each of functional blocks discussed above with reference to signal generator 100. Signal generator 200 includes battery circuit 222, temperature reporting circuit 221, switch control circuit 223, and energy storage circuit 224 corresponding in function to similarly named functional blocks of FIG. 1. The signal designations $V_A$, $V_B$, $V_P$, $V_S$, and $V_T$ shown in FIG. 2 generally correspond to similarly named signals in FIG. 1.

Battery circuit 222 includes battery 207 and memory 208. Battery 207 may include any rechargeable battery (e.g., lithium rechargeable cells). Memory 208 may include any conventional memory device (e.g., semiconductor, optical, magnetic). Battery 207 supplies power via battery signal $V_B$ to memory 208 and other portions of circuit 200. Memory 208 provides data readable by a temperature reporting circuit 221.

Temperature reporting circuit 221 includes processor 202 and memory 204 coupled by bus 210. Processor 202 and memory 204 cooperates as a conventional microprocessor circuit. Processor 202 has the ability to read memory 208 of battery circuit 222. In this way, memory 208 may include software and parameters for operation of signal generator 200 (e.g., a field upgrade). Software and parameters are transferred by processor 202 from memory 208 into memory 204 via bus 210. Processor 202 includes an integrated temperature detector 203, integrated on the same substrate on which processor 202 circuits are formed. Processor circuit 202 is in thermal communication with battery 207 so that temperature detected by temperature detector 203 corresponds generally to a temperature of battery 207. In another implementation, temperature detector 203 detects ambient temperature within an enclosure that encloses battery 207. Processor 202 reads temperature detector 203 and reports the measured temperature in any suitable manner via control signal $V_A$.

Processor 202 receives signals from two switches S1 and S2. Switches S1 and S2 provide a conventional user interface for operation of an electric discharge weapon that includes signal generator 200. In one implementation, switch S1 is a safety switch that must be closed to enable firing of the weapon. Switch S2 provides a trigger switch operable by a user's index finger for firing the weapon.

Switch circuit 223 includes bias circuit 212, pulse generator 214, and pulse generator control circuit 220. Bias circuit 212 receives battery signal $V_B$ and energy from a winding of transformer T1 discussed below. By combining energy from battery signal $V_B$ and energy received from the winding, bias circuit 210 maintains a suitable output voltage signal coupled to pulse generator 214 for proper operation of pulse generator 214 with less reliance on the amplitude of battery signal $V_B$. In other words, because voltage from winding W1 of transformer T1 (e.g., six to eight volts) generally exceeds the voltage of battery signal $V_B$ providing a suitable bias voltage for operation of pulse generator 214.

A pulse generator control circuit enables pulse generation and/or specifies timing information to a pulse generator. For example, pulse generator control circuit 220 receives battery voltage signal $V_B$, control signal $V_A$, and feedback signal $V_T$. Pulse generator control circuit 220 provides a RUN signal and a SYNC signal. The RUN signal enables an operation of pulse generator 214, for example, without receiving RUN signal asserted, pulse generator 214 provides no output on switch signal $V_S$. The SYNC signal conveys timing information to pulse generator 214. If timing information is not provided, a default timing may be used by pulse generator 214.

A pulse generator provides a signal for operation of a switch circuit at times and at a rate suitable for the purpose of the signal generator 200. For example, pulse generator 214 receives a bias voltage $V_{IN}$ from bias circuit 212, the control signal $V_A$ from processor 202, the RUN signal from circuit 220, and the SYNC signal from circuit 220. Pulse generator 214 produces output signal $V_S$ for operation of switch circuit 216 when signal RUN is asserted and control signal $V_A$ is present and within specifications (e.g., toggle rate). As a failsafe, if processor 202 fails (e.g., software runaway), signal generator 200 will not produce high voltage pulses because control signal $V_A$ will most likely fail to remain present and within specifications.

Energy storage circuit 224 includes switch circuit 216 transformer T1 and high voltage circuit 218. Transformer T1 provides a step-up of voltage from a primary winding W2 to one or more secondary windings of high voltage circuit 218. Primary winding W2 receives battery voltage signal $V_B$ in series with switch circuit 216. Operation of switch circuit 216 enables and disables current flow in primary winding W2. The interrupted current in primary winding W2 provides a step-up of voltage from the voltage of battery signal $V_B$ to a relatively high voltage input to high voltage circuit 218. The relatively high voltage may be in the range of 100 to 10,000 volts (e.g., 1000 to 6000 volts for an energy discharge weapon).

High voltage circuit 218 includes storage capacitor C1 and a spark gap GAP1. The voltage across capacitor C1 is indicated as signal $V_C$. When the voltage of signal $V_C$ exceeds the breakdown voltage of GAP1, an output pulse is produced across terminals of high voltage circuit 218. Each terminal connects to a probe and therefore conducts a signal, for example, signals PROBE1 and PROBE2. Output signal $V_P$ is measured from the terminal for signal PROBE1 to GND. A symmetric and opposite polarity output signal is produced from a terminal for signal PROBE2 to GND. Both signals are produced when GAP1 conducts. When GAP1 conducts, energy stored in capacitor C3 and C66 is released through a circuit that includes the terminals so that an energy of signals PROBE1 and PROBE2 may be conducted (e.g., delivered) through a target of the electric discharge weapon.

Switch circuit 216 may include any semiconductor or mechanical component sufficient to vary the current in primary winding W2. For example, switch circuit 216 may include a binary switch as discussed above.

A method of generating a signal, according to various aspects of the present invention, compensates for at least one condition of a limited source of energy to reduce a risk of an under-voltage condition of the source, as discussed above. Compensation may decrease a pulse repetition rate of the generated signal. For example, such a method may be performed by a signal generator of the type discussed above with reference to FIG. 1. Method 300 of FIG. 3 is a somewhat more particular example for use in an electric discharge weapon of the type discussed above with reference to FIG. 2 and may be simplified for use in signal generator 100. Method 300, of FIG. 3 includes processes cooperating to produce control signals as discussed above with reference to FIG. 2. Each process may be performed whenever data sufficient for operation is present (e.g., a parallel processing and/or multitasking environment). Process 300 includes get maximum delivery rate process 302, get battery temperature process 304, detect trigger process 306, detect delivery process 308, enable delivery process 310, thresholds store 312, get safe operating voltage process 314, get battery voltage process 316, and set modulation rate and duration process 318. These processes may be performed by any conventional circuitry (e.g., a processor circuit, a logic circuit, the cooperation of hardware and software in a control circuit). The circuitry and software (if any) constitute an engine or controller that performs the method.

Method 300 automatically controls signal generation (e.g., part of the operation of 100 or 200) to deliver a series of pulses having a pulse repetition rate. Each pulse is said to be delivered when output signal $V_P$ gives rise to delivered energy through one or more output terminals of the signal generator. According to various aspects of the present invention, a control signal provides an active safety function, conveys information from which a delivery rate may be determined, and conveys information from which a battery temperature may be determined. In other implementations, these three functions may be provided by two or more signals.

Control signal $V_A$ provides an active safety function by including a modulation that must be detected to enable charge storage by the energy storage circuit. Lack of the modulation may indicate: (a) an intent by the user to no longer enable operation of the signal generator circuit; or (b) a failure of the signal generator circuit. By enabling delivery using a modulated signal, a greater measure of safety and reliability in the operation of a weapon results.

A signal generator may have the capability to produce pulses at a specified maximum delivery rate. The maximum delivery rate may be specified by a circuit or by user input. For example, method 300 includes receiving a signal that specifies a maximum delivery rate. A get maximum delivery rate process receives a control signal and determines a desired pulse repetition rate for the signal generator output signal $V_P$. For example, get maximum delivery rate process 302 receives control signal $V_A$ and determines a binary value for the desired pulse repetition rate by demodulating and/or sampling control signal $V_A$. For instance, when control signal $V_A$ is conveyed on a single conductor, control signal $V_A$ may include a binary value conveyed in a series of bits. Get max delivery rate process 302 samples an amplitude of control signal $V_A$ to detect each bit and determine a binary value for a desired pulse repetition rate (also called a desired delivery rate). The binary value is provided to enable delivery process 310. When a maximum delivery rate is fixed, process 302 may be omitted with commensurate simplification of other processes of method 300.

Battery temperature may be determined in any conventional manner. A control signal may convey an indication of present battery temperature. A get battery temperature process receives a control signal and determines a present battery temperature. For example, get battery temperature process 304 receives control signal $V_A$ and determines a binary value for the present battery temperature by demodulating and/or sampling control signal $V_A$. For instance, when control signal $V_A$ is conveyed on a single conductor, control signal $V_A$ may include a binary value conveyed in a series of bits. Get battery temperature process 304 samples an amplitude of control signal $V_A$ to detect each bit and determine a binary value for the present battery temperature. Control signal $V_A$ may have a conventional modulation and data format to include indicia of battery temperature. In one implementation, control signal $V_A$ has a modulation and format identical to that used for conveying a maximum delivery rate as discussed above. The binary value representing present battery temperature is provided to process 314.

A detect trigger process detects operation of a trigger switch. Operation is expected to be accomplished by a user of the weapon. Any conventional trigger switch circuit and/or trigger operation detection logic may be used. For example, detect trigger process 306 monitors trigger switch S2 at a suitable monitoring rate (e.g., five times per second). When operation of the trigger is detected, detect trigger process 306 provides any suitable indication to enable delivery of process 310.

A detect delivery process determines that a pulse has been provided by output signal $V_P$. Any conventional techniques for detecting delivery of a pulse may be used. For example, detect delivery process 308 receives feedback signal $V_T$ from a point in the primary winding circuit discussed above. Since the impedance impressed across the secondary of transformer T1 is different when gap GAP1 is conducting than when gap GAP1 is not conducting, feedback signal $V_T$ includes an indication of the operation of GAP1 from which delivery is inferred. Delivery of a pulse on output signal $V_P$ can be inferred from the change in voltage amplitude of feedback signal $V_T$. Detect delivery process 308 monitors the amplitude of feedback signal $V_T$ for indication of operation of gap GAP1. On detecting delivery, process 308 indicates the same to enable delivery process 310 in any conventional manner.

An enable delivery process enables delivery of output pulses from the signal generator. Enablement may further govern the output pulse repetition rate of the signal generator. Two implementations are contemplated. In a first implementation, the enable delivery process provides a signal that enables each output pulse of the signal generator. For example, enable delivery process 310 may continuously assert, or periodically assert and remove, a RUN signal. The RUN signal may be asserted when the safety and trigger switches (e.g. S1 and S2) are suitably operated by the user as determined by process 306. The RUN signal may be removed after delivery of a pulse as determined by process 308 for a time sufficient to assure that the output pulse repetition rate of the signal generator is not greater than the desired delivery rate determined by process 302. When the RUN signal is asserted, transfer of energy from the switch control circuit to the energy storage circuit is enabled; when the RUN signal is removed, little or no energy is transferred from the switch control signal to the energy storage circuit. Enable delivery process 310 may measure the period of time in which energy is being stored (herein called a charging phase) from the assertion of the RUN signal to the time a pulse is delivered. Process 310 calculates a minimum period from the maximum delivery rate provided by process 302. Process 310 may then determines a period of time in which energy is not to be stored (herein called a resting phase) (if any) from the delivery of the output pulse to the next assertion of the RUN signal. The resting phase avoids too rapid a delivery of the next output pulse. In conditions requiring relatively long charging phase durations, the resting phase may be omitted (e.g., the RUN signal remains asserted for more than one output pulse). Processes 310 and 318 may share information to accomplish control of RUN signal duty cycle as may be desired (e.g., conforming to a range between a predetermined minimum duty cycle to a predetermined maximum duty cycle). If the maximum duty cycle is not sufficient for maintaining a desired delivery rate, asserting control to assure the maximum duty cycle is not exceeded may result in the actual delivery rate being less than the desired delivery rate of signal $V_P$.

In a second implementation, the RUN signal is continuously asserted in response to proper operation of the safety and trigger switches. For example, one pull of a trigger switch may result in a minimum duration of signal generator output. Or, one pull of the trigger switch may result in continuous signal generator output. In either case, signal RUN may be asserted for the duration of delivering signal generator output. Process 310 in this implementation does not require access to the desired delivery rate. As opposed to the first implementation, suitable simplifications to process 310 are made. Process 318 is responsible for governing the output pulse repetition rate as discussed below.

A threshold store provides a threshold value describing an unsafe condition of the battery. For example, thresholds store 312 provides a threshold value for comparison to present battery voltage (e.g., amplitude of signal $V_B$. Operation of the signal generator at a battery voltage below the threshold is considered unsafe because a substantial risk exists that an under-voltage condition of the battery will result. Generally, operation is considered unsafe when an under-voltage condition of the battery has a probability of occurrence that exceeds a design limit. Threshold values may be stored in any conventional manner. In accordance with various aspects of the present invention, thresholds store 312 provides a threshold value as a function of battery temperature by including a table accessed (e.g., indexed) by the result of process 304.

A get safe operating voltage process determines a safe operating voltage threshold in accordance with present battery temperature. For example, get safe operating voltage process 314 receives a battery temperature value from process 310, then uses the battery temperature value as an index to receive a corresponding threshold from threshold store 312. The value received from threshold store 312 is reported to set modulation rate and duration process 318 as a safe operating voltage value.

A get battery voltage process provides a battery voltage value corresponding to the present voltage output of the battery that supplies operating power to the signal generator. For example, get battery voltage process 316 receives battery voltage signal $V_B$ and determines a binary value in any suitable manner. The binary value is reported to set modulation rate and duration process 318. For instance process 316 may include analog to digital conversion, digital filtering (e.g., hysteresis), and/or encoding (e.g., gray code, or compression) for efficient use by process 318.

A set modulation rate and duration process provides a switch control signal to accomplish charging during a charging phase of suitable duration so as to avoid an under-voltage condition of the battery. For example, set modulation rate and duration process 318 provides switch control signal $V_S$ having a repetition rate (e.g., a default rate or a rate corresponding to SYNC signal discussed above) and a duration (e.g., a duty cycle). Signal $V_S$ is provided in accordance with a received safe operating voltage value from process 314 and a received present battery voltage value from process 316. When enable delivery process 310 continuously asserts RUN signal as discussed above in a second implementation of process 310, process 318 further provides signal $V_S$ in accordance with a received maximum delivery rate from process 302. If the present battery voltage value disagrees with the safe operating voltage value (e.g., crosses a threshold or goes outside an acceptable range), a modulation rate may be adjusted and/or a modulation duty cycle may be adjusted. Increasing these adjustments may be advantageous to warm the battery as may be desired. Decreasing these adjustments may avoid an under-voltage condition (e.g., failure of the battery to provide proper operating voltage to any of the control circuits of the signal generator). Decreasing these adjustments facilitates reliable operation of the signal generator, though at a reduced power output. By reducing the modulation rate and/or decreasing the duty cycle, a sag of battery voltage that may brown out the signal generator circuitry is avoided or corrected.

Set modulation rate and duration process 318 may provide an intermediate signal and/or the switch control signal $V_S$ as discussed above. For example, process 318 may provide the SYNC signal as discussed above to convey a pulse repetition rate for timing and adjustments of the switch control signal $V_S$. The SYNC signal may be a binary signal having a duty cycle proportional to the amount of current drawn from a battery, the duty cycle of the SYNC signal may be adjusted during a single charging phase to assure uniform incremental charging of the energy storage circuit and consequently uniform incremental discharging of the battery. Uniform incremental discharging of the battery may promote reliable battery operation and/or extended battery life. The repetition rate and duty cycle of the SYNC signal may determined the repetition rate and duty cycle of switch control signal $V_S$.

Figure 4A:
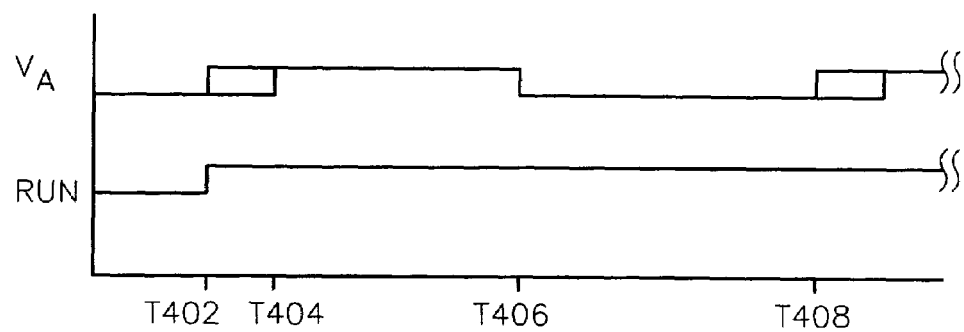
FIGS. 4A and 4B are timing diagrams of signals of FIGS. 1 and 2.

Signals for a signal generator 100, 200, or a method 300 of the type discussed above may have formats as shown in FIGS. 4A and 4B. The time scale for FIG. 4B may not coincide to the time scale of FIG. 4A. For example, the period of signal $V_A$ may be about 2 milliseconds and the period of signal $V_P$ may be about 50 milliseconds. Signals of FIG. 4B as shown occur during a time when signal RUN is asserted, and may be independent of the state of signal $V_A$ (e.g., prior to or following time T406).

Control signal $V_A$ may be a serial digital signal having two amplitudes, a lower amplitude for a logic zero and a higher amplitude for a logic one. At time T402 to T404 control signal $V_A$ may present, in series, binary bits conveying indicia of delivery rate (302) and battery temperature (310) (in any order). A start bit may be included at time T402. From time T404 to time T406 control signal $V_A$ may remain high. At time T406 a logic transition to logic zero precedes a time from time T406 to time T408 that control signal $V_A$ is low. From time T402 to time T408 one period of the control signal $V_A$ is illustrated. Subsequent periods may repeat indefinitely with the same format. The period from time from T402 to time T408 presents a modulation that must be detected to ensure safety as discussed above. The period may be in the range of about 0.2 milliseconds to about 10 milliseconds, preferably about 2 milliseconds for easily distinguishing a start bit at time T402. The serial bit rate from time T402 to time T404 may be from about 1 Kbaud to about 250 Kbaud, preferably about 96 Kbaud for compatibility with relatively low cost control circuits.

Signal RUN may remain asserted for an indefinite number of periods of signal $V_A$. As shown, signal RUN is asserted at time T402 and corresponds to the second implementation of process 310 discussed above.

Figure 4B:
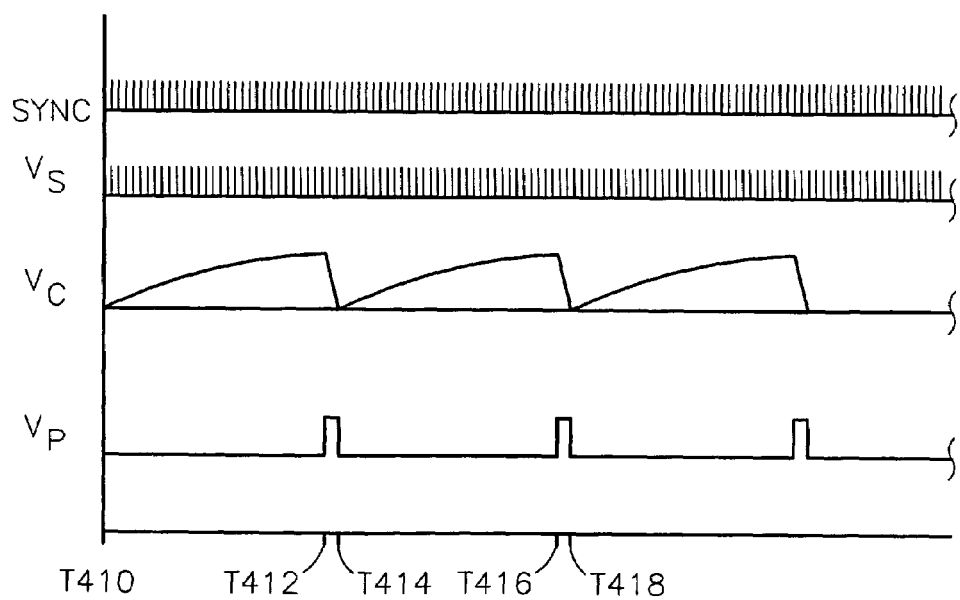

A switch control signal may comprise a series of equal amplitude pulses regularly spaced in time. Such a series assures relatively even increments of energy transfer from a battery to an energy storage circuit. As shown in FIG. 4B, the SYNC signal and switch control signal $V_S$ may have the same repetition rate. The pulses of each of signals SYNC and $V_S$ may be equally separated constituting a respective repeating period and duty cycle for each pulse. The duty cycle of a pulse of switch control signal $V_S$ may be any suitable period and duty cycle to accomplish transfer of energy from the battery to the high voltage circuit as discussed above. Each pulse represents an increment of energy transferred. As discussed above, energy storage circuit 108 may include a capacitor for storing energy.

Stored energy signal $V_C$ indicates energy being stored during a charging phase from time T410 to time T412. No resting phase is illustrated.

After energy storage circuit 108 receives a sufficient amount of energy (e.g., attains a voltage sufficient to operate gap GAP1), an output pulse is provided on signal $V_P$ from time T412 to time T414. The duration and shape of the output pulse on signal $V_P$ include any suitable amplitude and shape for the application of signal generator 100. As shown, one pulse of signal $V_P$ is relatively short in duration yet sufficient to effectively fully discharge energy storage circuit 108. In other words, at time T414, the return to base line of output signal $V_P$, energy storage circuit 108 is fully discharged, as also indicated by the minimum of signal $V_C$. At time 414 the falling edge of signal $V_P$ is detected. A change in modulation frequency may be determined based on the time elapsed between time T410 and time T412.

The SYNC signal may facilitate government of the charging phase (e.g., from time T410 to a time when signal $V_P$ is detected at time T412). SYNC signal repetition rate and duty cycle may be adjusted. For example, SYNC signal from time T410 to time T412 may provide a quantity of pulses for each delivered pulse of signal $V_S$. If the quantity of pulses of the SYNC signal is decreased, charge signal $V_C$ is delayed in achieving a maximum value and the period between output pulses on output signal $V_P$ is extended. In other words, as battery temperature and/or battery voltage tend toward indicating a substantial risk of an under-voltage condition of the battery, the quantity of pulses of SYNC signal between time T410 and time T412 may be decreased. A duty cycle of the SYNC signal may be adjusted in accordance with conventional current mode pulse generation technology.

Energy storage circuit may be "on" from time T410 to about time T412 and "off" from about time T412 to time T416 to produce one output pulse on output signal $V_P$. The time T410 to time T412 depends in part on battery voltage, battery temperature, the modulation rate and duration discussed above with reference to processes 310 and 318, and circuit values including the breakdown voltage of gap GAP1. Consequently, the duty cycle of the RUN signal (if not continuous) and, the frequency and duty cycle of the SYNC signal accomplish control of signal $V_S$ (and consequently signal $V_P$ as discussed above).

RUN and SYNC signal adjustments may be coordinated. For example, as battery temperature and/or battery voltage tend toward indicating a substantial risk of an under-voltage condition of the battery, the quantity of pulses of SYNC signal between time T410 and time T412 may be decreased and/or the duty cycle of the RUN signal may be increased to maintain the desired delivery rate of output pulses on signal $V_P$. For instance, signal RUN may be pulled low at a suitable time to disable further delivery of output pulses on signal $V_P$. In the event that further adjustment exceeds a minimum SYNC signal and/or a maximum duration RUN signal (if not continuous), the delivery rate of output pulses on signal $V_P$ may be reduced. In one implementation, signal RUN is pulled low to disable the delivery of output pulses on signal $V_P$.

Because the adjustments described above are dynamic, a change of adjustments back to a normal condition may occur when conditions affecting battery voltage and/or battery temperature move back to normal (e.g., the weapon is no longer in direct sunlight, the battery module is replaced or recharged).

A desired delivery rate (302) may be stored in memory 208 and may be transferred to memory 204 by processor 202. The desired delivery rate may include a code corresponding to from 10 to 30 pulses per second. The desired delivery rate may include a selected code of a set of codes, for example, a code selected from a set corresponding to 15 pulses per second (for commercial weapons) and 19 pulses per second (for military weapons).

Thresholds 312 may be stored in memory 208 and may be transferred to memory 204 by processor 202. In another implementation, an algorithmic description of values for thresholds store 312 may be stored in memory 208 and/or 204.

Processes of method 300 may be performed by processor 202, pulse generator control circuit 220, and pulse generator 214. In one implementation pulse generator control circuit 220 and pulse generator 214 perform all processes of method 300 except process 306. In another implementation, all functions of a pulse generator control circuit 220 as discussed above are performed by processor 202 and pulse generator control circuit 220 is omitted.

Figure 5:
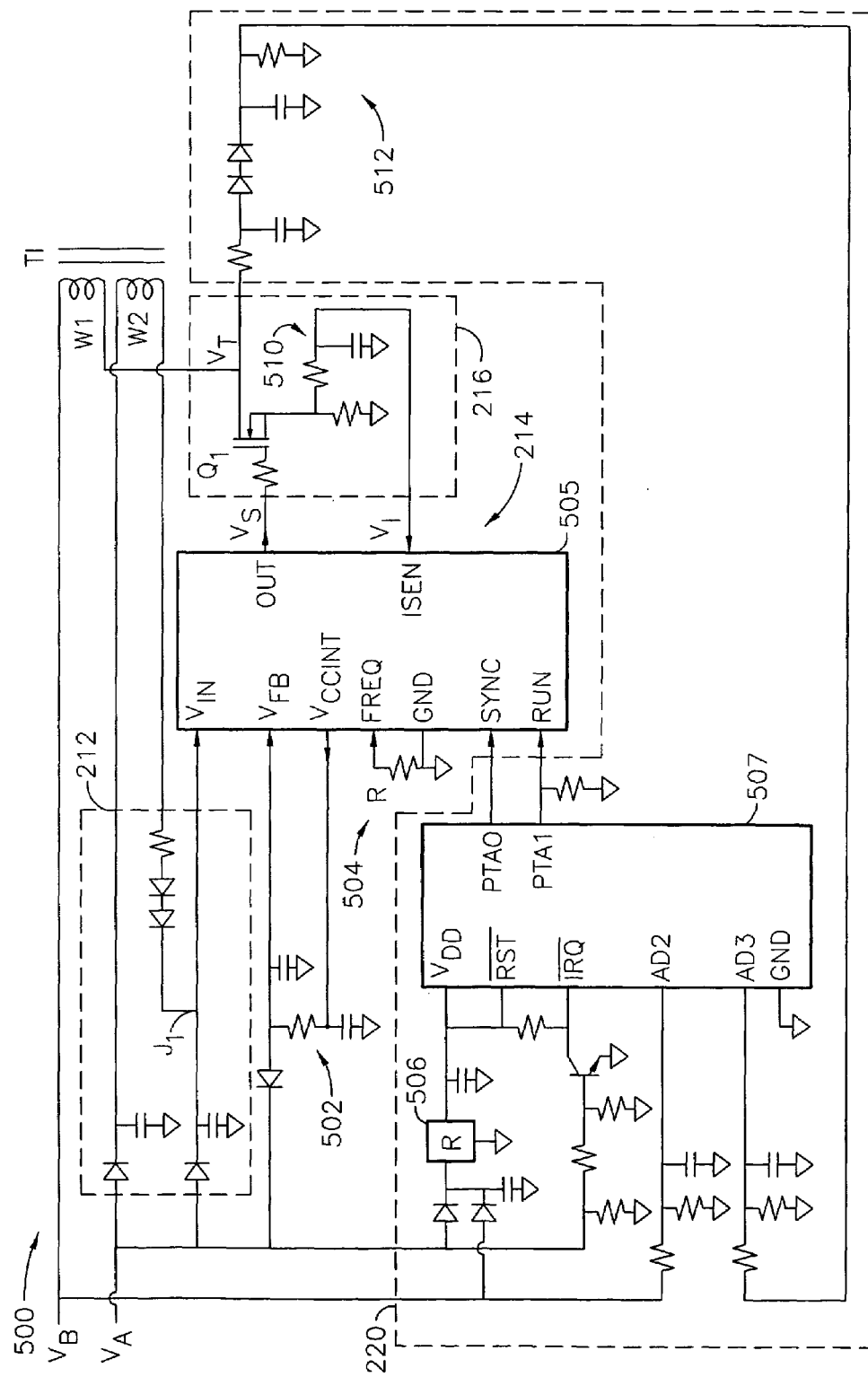
FIG. 5 is a schematic diagram of an exemplary switch control circuit for use in the signal generators of FIGS. 1 and 2.
Figure 6:
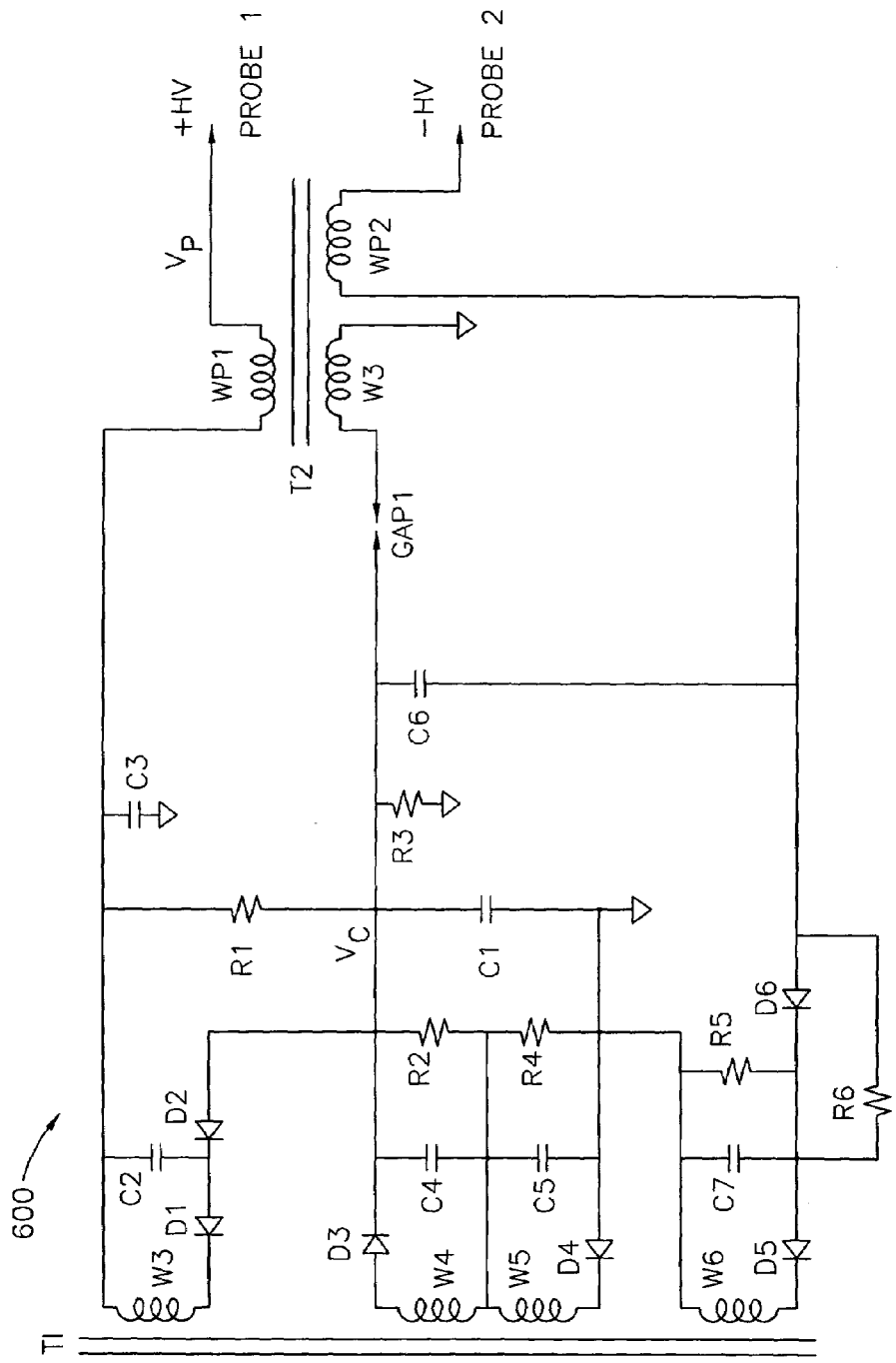
FIG. 6 is a schematic diagram of an exemplary energy storage circuit for use in the signal generators of FIGS. 1 and 2.

In accordance with various aspects of the present invention, a signal generator 100 or 200 may be implemented per schematic diagrams presented in FIGS. 5 and 6. Switch control circuit 500 includes a bias circuit 212, a pulse generator circuit 214, a switch circuit 216, and a pulse generator control circuit 220 as discussed above. Bias circuit 212 includes a conventional arrangement of rectifiers, smoothing capacitors, and feedback to a summing junction J1. Pulse generator circuit 214 includes a conventional integrated circuit pulse generator 505, a conventional feedback circuit 502, and a conventional circuit 504 for setting a minimum pulse repetition rate for signal $V_S$. In one implementation, integrated circuit 505 comprises part number LTC1871 marketed by Linear Technologies Corp. Integrated circuit 505 provides a control function for a pulse generator for a switching regulator operating in a current regulating mode. Output signal $V_S$ is provided to switching transistor Q1 as a gate source voltage. Source bias circuit 510 provides a voltage corresponding to current conducted by switch Q1. Circuit 512 samples drain voltage of switch Q1 and provides signal conditioning and scaling suitable for input to control circuit 507. Control circuit 507 receives operating voltage VDD through a conventional three terminal regulator and associated rectifying and smoothing circuits. Circuit 508 provides signal conditioning for the service of each logic transition of control signal $V_A$. The state of control signal $V_A$ during expected bit times is sampled by an interrupt service routine activated by circuit 508. In one implementation, integrated circuit 507 comprises part number MC68HC908 marketed by Motorola. Integrated circuit 507 receives battery voltage $V_B$ and a feedback signal derived from signal $V_T$ for analog to digital conversion and analysis by control software performed by control circuit 507.

High voltage circuit 600 utilizes several secondary windings of transformer T1. In general, a positive high voltage signal referenced to ground is provided during each pulse of output signal $V_P$ as discussed above and in addition, a negative high voltage signal is also provided referenced to ground. In this manner, components, layouts, and insulation may be provided for, in effect, half the high voltage potential being produced by high voltage circuit 218. Capacitor C1 provides energy to ionize spark gap GAP1. Capacitors C3 and C6 predominantly provide energy to be transferred to the target. Signal $V_C$ appears across gap GAP1 until capacitor C1 is fully charged. When fully charged, gap GAP1 conducts through pulse transformer T2 primary winding W3 to energize PROBE1 and PROBE2 via secondary windings WP1 and WP2. Resistors generally provide discharge paths for charge storage elements for safety purposes. Charge storage elements C1 through C7 have values suitable for the pulse shape to be produced in each pulse of output signal $V_P$.

High voltage circuit 600 may include a half wave rectifier circuit having particular advantages over conventional half wave rectifier circuits. By reducing the voltage across components of the half wave rectifier circuit by 50%, substantial power losses are avoided of the type that increase with the square of such voltage. In particular, a half wave rectifier circuit supplied by a center tapped transformer winding may be used. For example, the circuit producing signal $V_C$ comprises a half wave rectifier including two identical windings W4 and W5 combined to provide the same electrical performance as a center tapped secondary winding. The half wave rectifier circuit further includes diodes D3 and D4 (respectively in series with each winding W4 and W5), filter capacitors C4 and C5 and bleed resistors R2 and R4. The output of the rectifier is provided from the cathode of diode D3 to the anode of diode D4. Resistors R2 and R4 as well as capacitors C4 and C5 connect the center tap to each output terminal of the half wave rectifier circuit. An electric discharge weapon comprising the half wave rectifier circuit discussed above exhibits longer battery life and produces less waste heat in operation. In some applications the capacity of the battery and/or the expense of the battery recharge cycle may be reduced.

Figure 2:
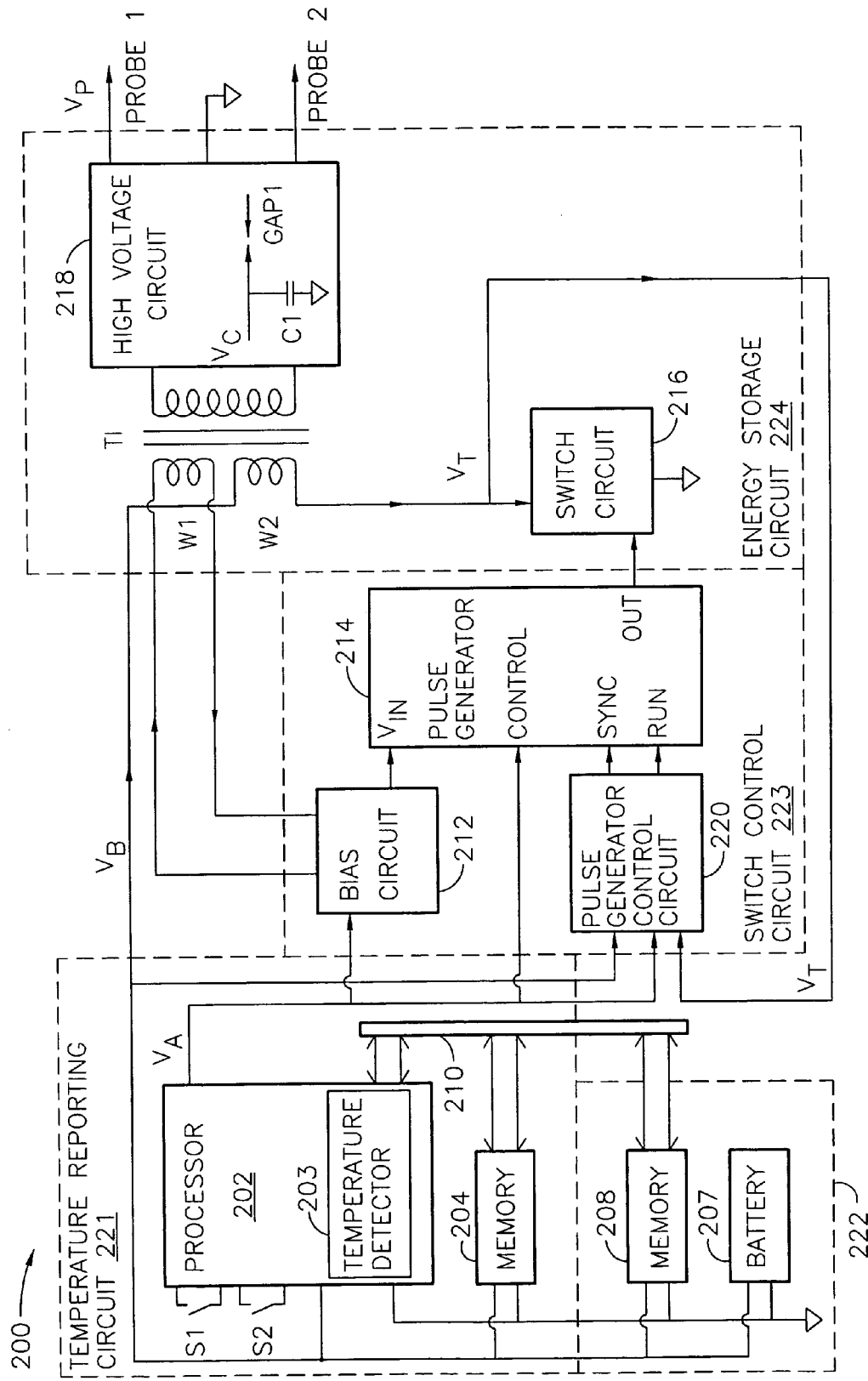
FIG. 2 is a functional block diagram of a signal generator in one implementation of the signal generator of FIG. 1.
Figure 3:
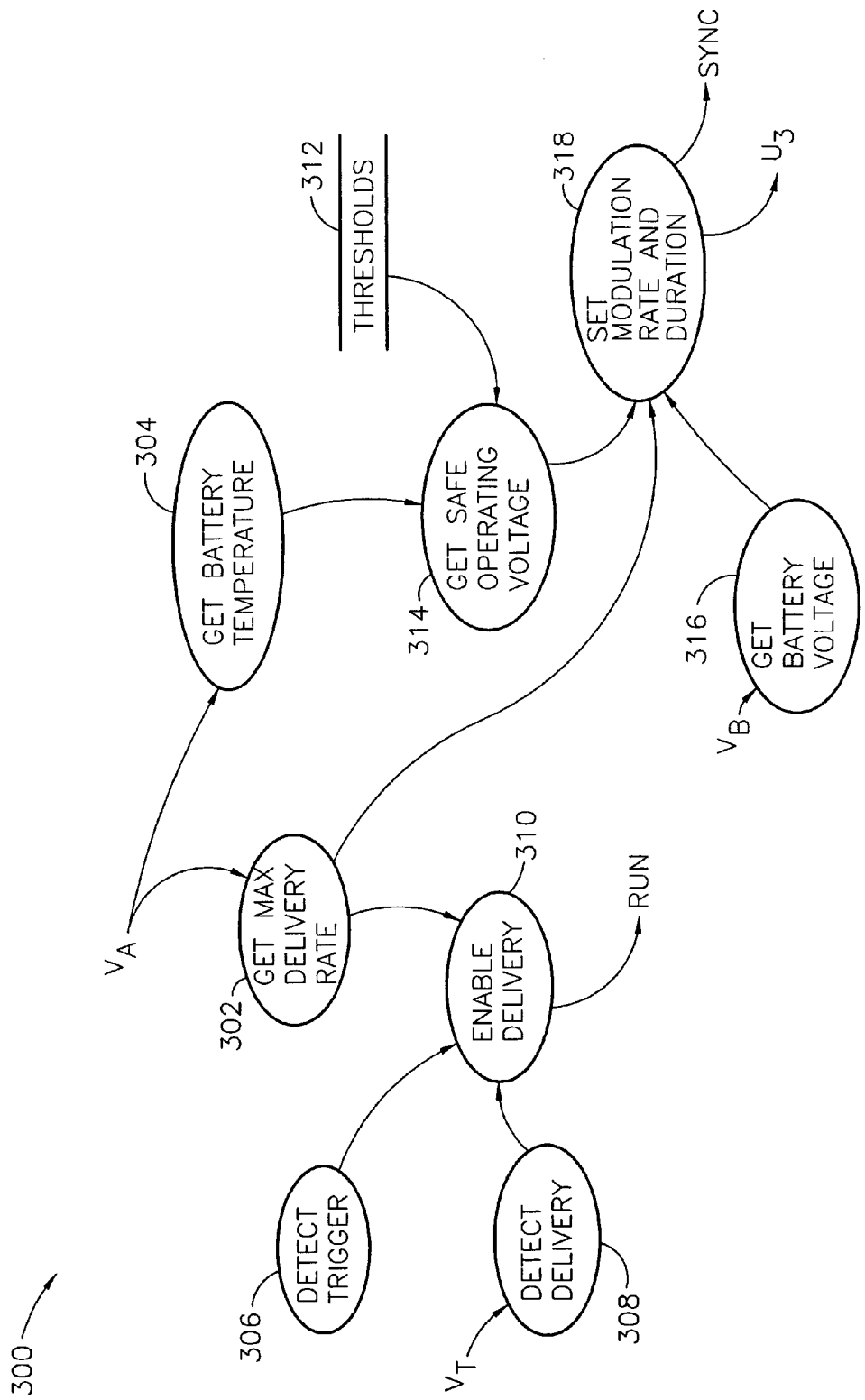
FIG. 3 is a data flow diagram of a method performed by the signal generator of FIG. 2.
Figure 7:
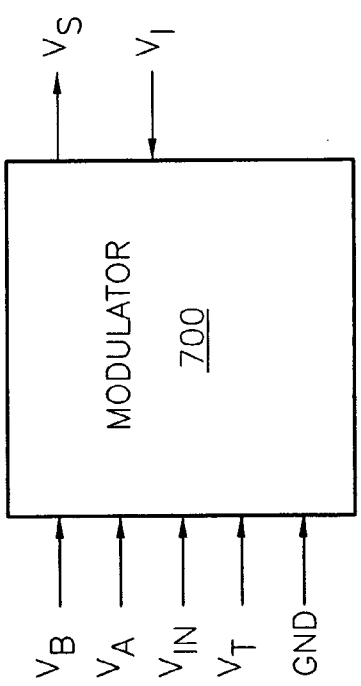
FIG. 7 is a functional block diagram of a modulator according to various aspects of the present invention.

The circuits described in FIGS. 2 and 5 may be combined in an integrated circuit modulator as illustrated in FIG. 7. Modulator 700 of FIG. 7 accepts as input signals $V_B$, $V_A$, $V_{IN}$, $V_T$, $V_P$, and GND. Modulator 700 produces output switch control signal $V_S$. All of these signals are as discussed above. In one implementation, modulator 700 is an application specific integrated circuit formed from elements of a standard cell library.

The foregoing description discusses preferred embodiments of the present invention which may be changed or modified without departing from the scope of the present invention as defined in the claims. While for the sake of clarity of description, several specific embodiments of the invention have been described, the scope of the invention is intended to be measured by the claims as set forth below.

What is claimed is:

1. A method for providing an output signal, the output signal comprising a series of pulses having a pulse repetition rate, the method comprising:
after delivery of a pulse of the output signal, operating a switching circuit in a first mode to provide the pulse repetition rate of the output signal; and
operating the switching circuit in each of the first mode and a second mode at a toggling rate, wherein relatively more energy from a battery is stored as a consequence of the second mode than is stored as a consequence of the first mode, energy from the battery being stored for delivery in a pulse of the output signal, the toggling rate being compensated in accordance with a temperature of the battery and a voltage of the battery; compensation for maintaining the battery voltage above a minimum value.

2. The method of claim 1 wherein operation at the toggling rate further comprises adjusting the toggling rate in accordance with the temperature of the battery.

3. The method of claim 2 wherein operation at the toggling rate further comprises decreasing the pulse repetition rate of the output signal in accordance with increased battery temperature.

4. The method of claim 1 further comprising:
receiving a control signal that conveys the temperature of the battery;
detecting a modulation of the control signal; and
operating the switching circuit in the first mode while the modulation is not detected.

5. The method of claim 4 wherein the temperature of the battery is conveyed in bit-serial format.

6. The method of claim 1 wherein compensation is for maintaining the battery voltage above a minimum value during a period when power is being supplied by the battery.

7. The method of claim 6 wherein the minimum value is determined in accordance with the temperature of the battery.

8. A memory device comprising instructions for performing the method of any of claims 1 through 7.

9. A signal generator that provides an output signal, the output signal comprising a series of pulses having a pulse repetition rate, the signal generator comprising:
an energy storage circuit comprising a switch; and
a switch control circuit that operates the switch, wherein:
(1) after delivery of a pulse of the output signal, the switch control circuit operates the switch in a first mode to provide the pulse repetition rate of the output signal; and
(2) the switch control circuit operates the switch in each of the first mode and a second mode at a switching rate, wherein relatively more energy from a provided battery is stored as a consequence of the second mode than is stored as a consequence of the first mode, energy from the battery being stored for delivery in a pulse of the output signal, the switching rate being compensated in accordance with a temperature of the battery and a voltage of the battery; compensation for maintaining the battery voltage above a minimum value.

10. The signal generator of claim 9 wherein operation at the toggling rate further comprises adjusting the toggling rate in accordance with increased temperature of the battery.

11. The signal generator of claim 10 wherein operation at the toggling rate further comprises decreasing the pulse repetition rate of the output signal in accordance with increased battery temperature.

12. The signal generator of claim 9 wherein the switch control circuit receives a control signal that conveys the temperature of the battery, detects a modulation of the control signal, and operates the energy storage circuit in the first mode while the modulation is not detected.

13. The signal generator of claim 12 wherein the temperature of the battery is conveyed in bit-serial format.

14. The signal generator of claim 9 wherein compensation is for maintaining the battery voltage above a minimum value during a period when power is being supplied by the battery.

15. The signal generator of claim 14 wherein the minimum value is determined in accordance with the temperature of the battery.

16. An electric discharge weapon comprising the signal generator of any of claims 9 through 15.

17. An electric discharge projectile comprising the signal generator of any of claims 9 through 15.

18. A signal generator that provides an output signal, the output signal comprising a series of pulses having a pulse repetition rate, the signal generator comprising:
storage means for storing energy from a provided battery for delivery in a pulse of the output signal; and
control means for operating the storage means, after delivery of a pulse of the output signal, in a first mode to provide the pulse repetition rate of the output signal; and for operating the storage means in each of the first mode and a second mode at a toggling rate, wherein relatively more energy from a provided battery is stored as a consequence of the second mode than is stored as a consequence of the first mode, the toggling rate being compensated in accordance with a temperature of the battery and a voltage of the battery; compensation for maintaining the battery voltage above a minimum value.

19. The signal generator of claim 18 wherein operation at the toggling rate further comprises decreasing the toggling rate in accordance with increased battery temperature.

20. The signal generator of claim 19 wherein operation at the toggling rate further comprises decreasing the pulse repetition rate of the output signal in accordance with increased battery temperature.

21. The signal generator of claim 18 wherein the control means receives a control signal that conveys the temperature of the battery, detects a modulation of the control signal, and operates the storage means in the first mode while the modulation is not detected.

22. The signal generator of claim 21 wherein the temperature of the battery is conveyed in bit-serial format.

23. The signal generator of claim 18 wherein compensation is for maintaining the battery voltage above a minimum value during a period when power is being supplied by the battery.

24. The signal generator of claim 23 wherein the minimum value is determined in accordance with the temperature of the battery.

25. An electric discharge weapon comprising the signal generator of any of claims 18 through 24.

26. An electric discharge projectile comprising the signal generator of any of claims 18 through 24.

* * * * *